Figure 1:
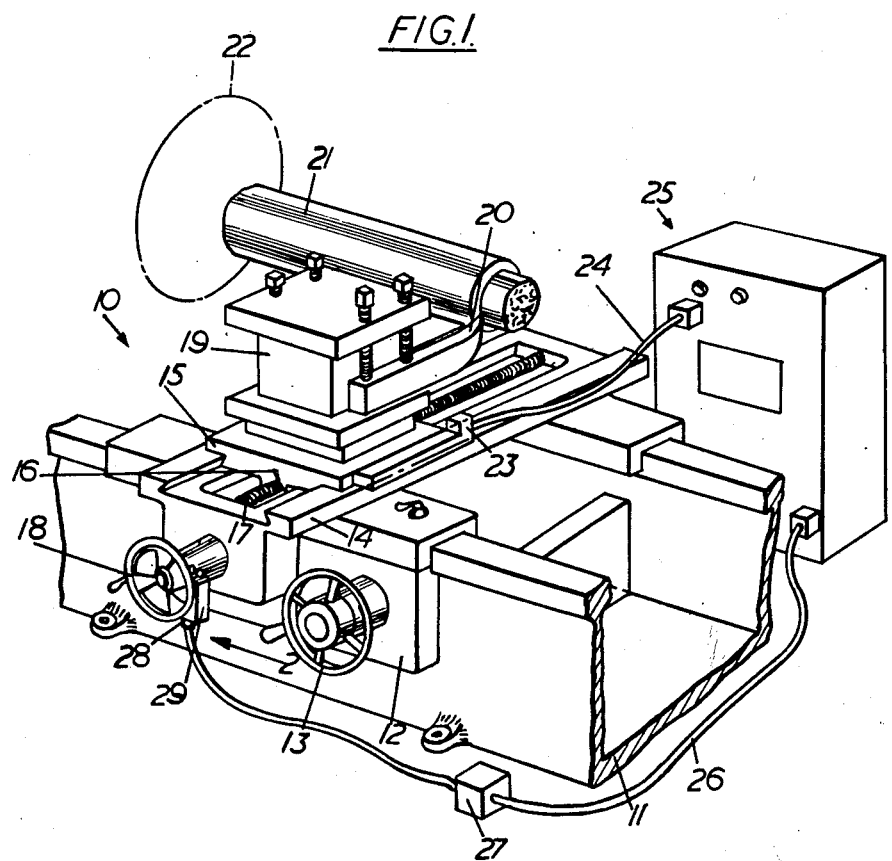

July 28, 1964

A. F. ALLEN 3,142,214

MACHINE TOOL CONTROL APPARATUS

Filed Jan. 7, 1963

5 Sheets-Sheet 1

Inventor
Arthur Frederick Allen

By
Fred E. Shoemaker
Fred L. Witherspoon Jr. Attorney

July 28, 1964 A. F. ALLEN 3,142,214
MACHINE TOOL CONTROL APPARATUS
Filed Jan. 7, 1963 5 Sheets-Sheet 2

Inventor
Arthur Frederick Allen

By
Fred F. Shoemaker
Fred L. Witherspoon, Attorney

3,142,214
MACHINE TOOL CONTROL APPARATUS
Arthur Frederick Allen, Littleover, Derby, England, assignor to Rolls-Royce Limited, Derby, England, a company of Great Britain
Filed Jan. 7, 1963, Ser. No. 249,740
Claims priority, application Great Britain Jan. 12, 1962
11 Claims. (Cl. 82—14)

This invention concerns apparatus for controlling a machine tool.

In certain industries such as the aero-engine industry, the materials employed are very expensive and the machining of these materials is often complicated and thus also expensive. In such industries it is therefore more than usually important to avoid the production of scrap. An object of the present invention is therefore to provide apparatus by means of which the risk of producing scrap is reduced. A further object is to provide apparatus capable of being adapted to existing machine tools in which wear has taken place.

According to the present invention, there is provided apparatus for controlling a machine tool, said apparatus comprising stop means which are adapted to prevent a cutting tool and a workpiece from being adjusted relatively towards each other, but which are adapted to permit them to be adjusted relatively away from each other when the workpiece has been machined to size, said stop means being adapted to be controlled by signals to prevent a subsequent cutting operation being performed until said workpiece has been machined to size.

Preferably the signals are electrical signals received from a position detector means for detecting the position of the cutting tool with respect to the workpiece.

The apparatus preferably also comprises an electronic information store, the stop means being controlled both by the position detector means and by the information store.

The apparatus may also comprise a holder for holding the workpiece, a holder for holding the cutting tool and holder adjustment means for effecting relative adjustment of the said holders so that the cutting tool and the workpiece may be adjusted relatively towards and away from each other.

The said stop means may be constituted by mechanical stop means which are adapted to be brought into and out of engagement with one of said holders or with means secured, or drivingly connected, thereto.

Thus the holder adjustment means may comprise a drive transmission to one of said holders, the mechanical stop means being movable into three positions, in the first of which they are out of engagement with the drive transmission, in the second of which they engage one or more parts of the drive transmission so as to prevent movement thereof in one sense only, and in the third of which they engage one or more parts of the drive transmission so as to prevent movement thereof in the opposite sense only.

Preferably there are sensor means for sensing whether the cutting tool and workpiece are being relatively adjusted towards or away from each other.

The sensor means preferably comprises a friction member which frictionally engages a part of the said drive transmission and which is moved thereby into one or other of two limiting positions according to the sense in which the said part is moved.

Thus electrically operated means may be provided for moving the mechanical stop means between said three positions, the electrically operated means including a switch which is moved by the friction member.

The electrically operated means preferably includes two solenoids which are respectively arranged to effect movement in opposite directions of the mechanical stop means, the said switch being moved by the friction member between two positions in which one or other of the solenoids is respectively put on open circuit.

Each solenoid preferably has an armature carrying a roller, and said rollers may be disposed in cam grooves in a slide member integral with or secured to the mechanical stop means, the arrangement being such that, when both solenoids are de-energised, the rollers are locked in their cam grooves and prevent movement of the slide member in either direction, energisation of one or other of the solenoids causing the respective roller to engage a part of its cam groove such as to effect movement of the slide member in one or other direction, such movement being permitted by the other roller.

The stop means preferably comprises at least one wedge member. Thus one of the said parts of the drive may be provided with a roller member and the wedge member may be provided with a concave recess, such that when the wedge member is in a central position, the roller member extends into and is freely rotatable in said recess, the wedge member being movable into two limiting positions in one of which the roller member may be rotated in one angular sense only, and in the other of which the roller may be rotated in the other angular sense only.

Thus the drive transmission means may comprise two meshing gears which are respectively provided with spaced apart roller members, the wedge member being disposed between said roller members, and being provided with diametrically oppositely disposed recesses into each of which one of the said roller members extends.

The drive transmission means preferably incorporates a friction drive whose parts will slip relatively to each other if they are subjected to torque in the direction in which their movement is resisted by the mechanical stop means.

Preferably the drive transmission means transmits drive to the holder for holding the cutting tools.

The invention is hereinafter described with reference to its application to a lathe, but it may in fact be applied to any machine tool.

Figure 2:
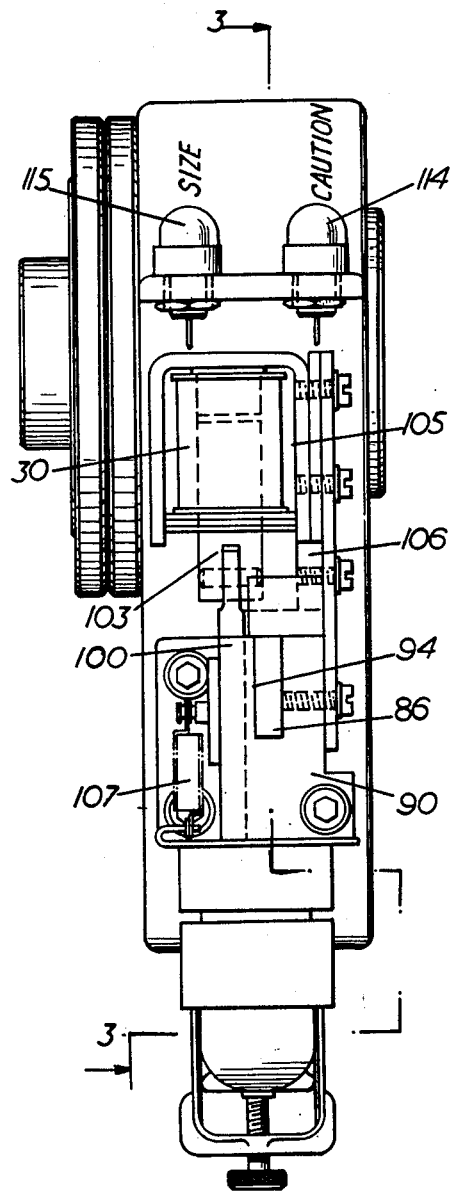
Figure 3:
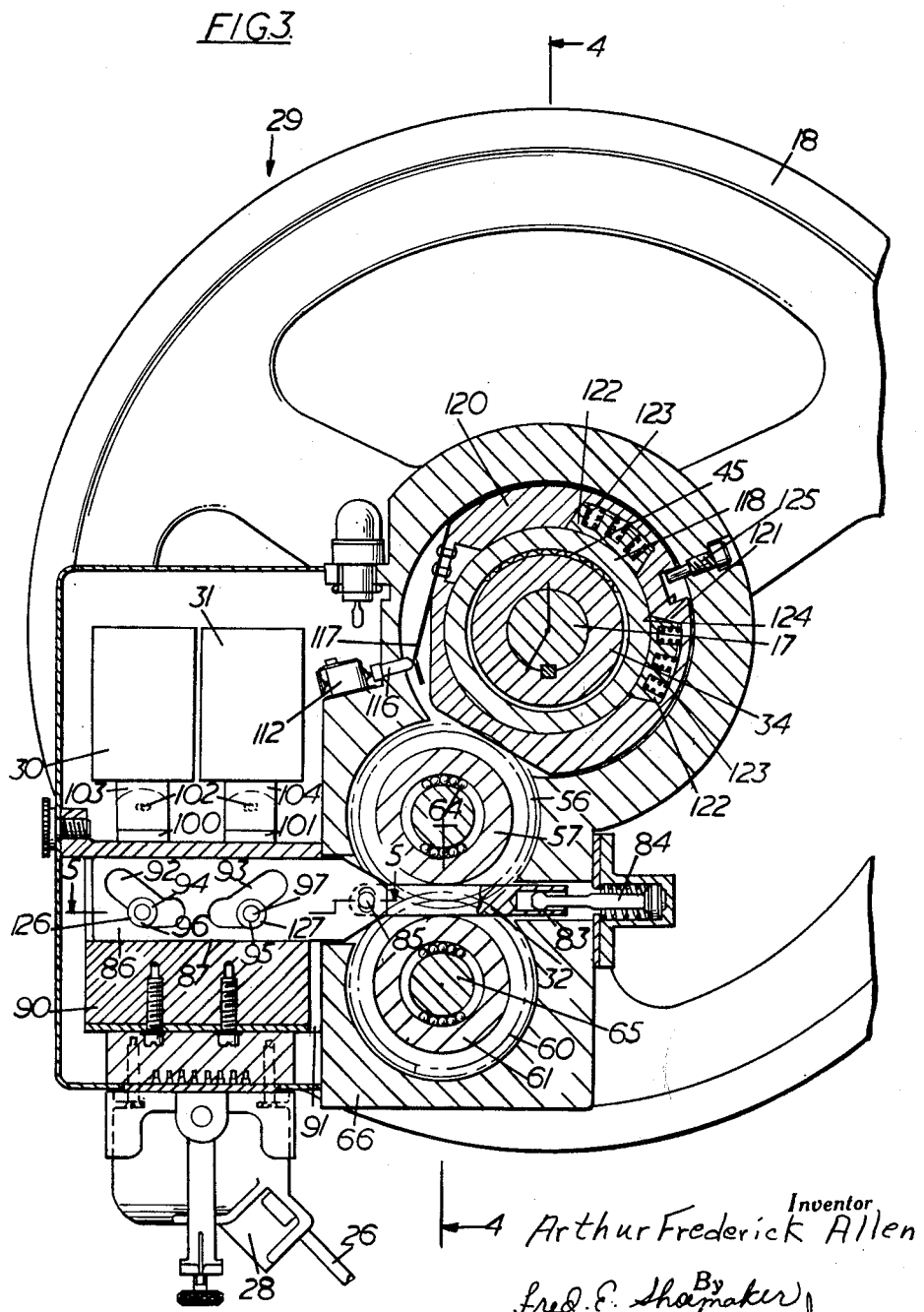
Figure 4:
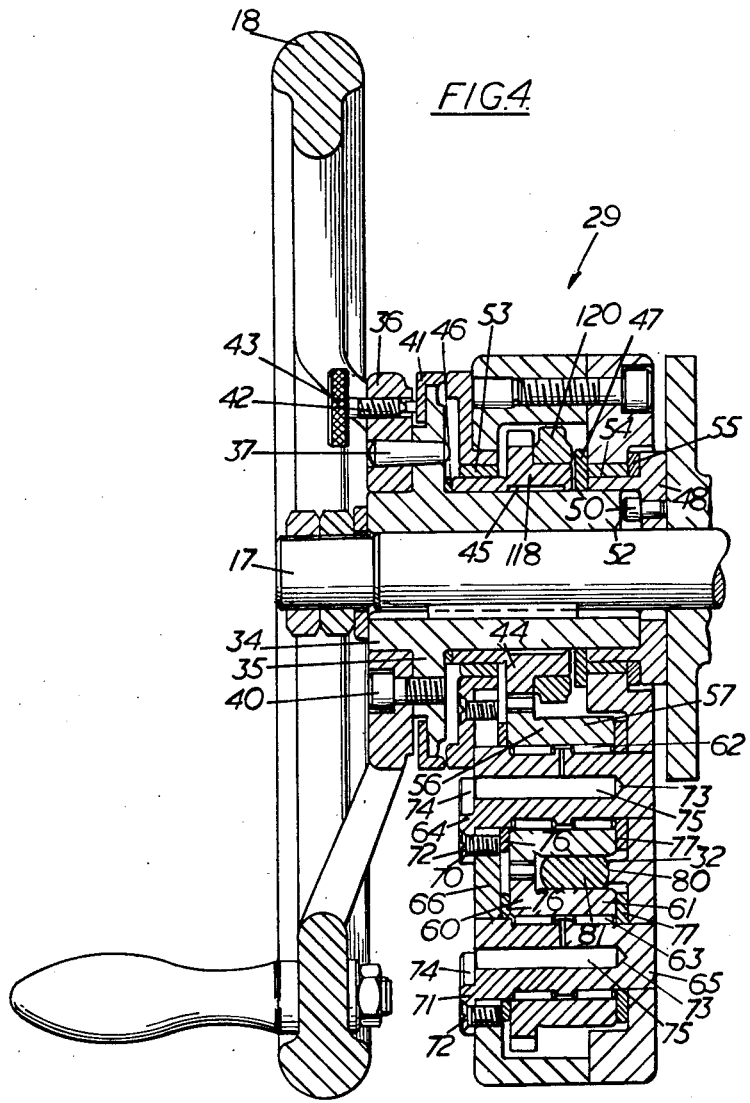
Figure 5:
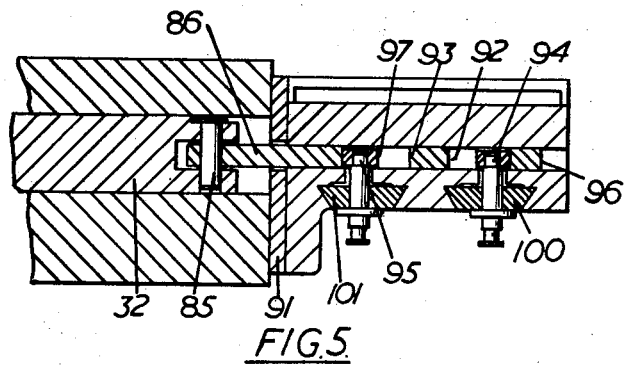
Figure 6:
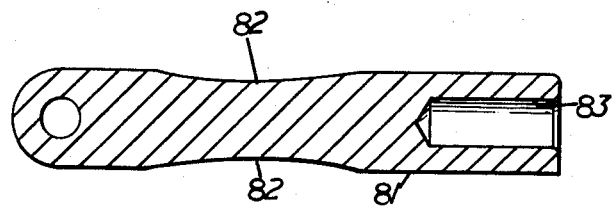
Figure 7:
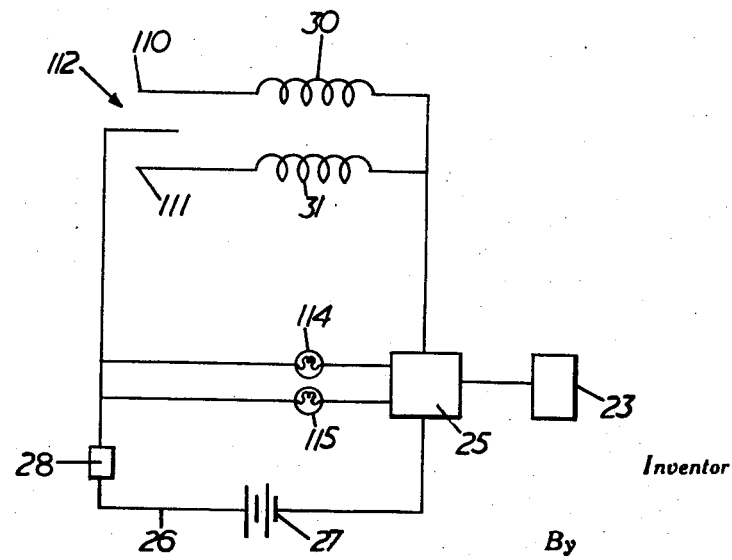

The invention is illustrated, merely by way of example, in the accompanying drawings, in which:

FIGURE 1 is a perspective view of a lathe including a control system according to the present invention, FIGURE 2 is an end view of part of the lathe of FIGURE 1, FIGURE 3 is a section taken on the line 3—3 of FIGURE 2, FIGURE 4 is a section taken on the line 4—4 of FIGURE 3, FIGURE 5 is a section taken on the line 5—5 of FIGURE 3, FIGURE 6 is an enlarged view of a wedge forming part of the structure shown in FIGURE 3, and FIGURE 7 is a diagrammatic circuit diagram.

Referring first to FIGURE 1, a capstan lathe 10 has a bed 11 on which is mounted a saddle 12. The saddle 12 may be traversed axially of the bed by means of a handwheel 13.

The saddle 12 carries a dovetail guide 14 on which is mounted a cross slide 15 having a nut portion 16 within which is threaded a cross slide lead screw 17 which may be rotated by means of a hand wheel 18.

Mounted on the cross slide 15 is a holder 19 for the mounting of a cutting tool 20 by means of which a workpiece 21 may be machined. The workpiece 21 is mounted in a chuck or other holder 22.

Mounted on the guide 14 is a position detector device 23 which is adapted to produce an electrical signal representative of the position of the cutting edge of the cutting tool 20 with respect to the workpiece 21.

The position detector device 23 is connected by a lead 24 to a control device 25 which contains an electronic information store and comparator circuits for comparing the signal produced by the position detector device 23 with a standard signal from the electronic information store, said signal being representative of the correct position which will be adopted by the cutting tool 20 when the latter has finished its final cut. The said information store may comprise a punched tape or a punched card (not shown).

The control device 25 is connected in a circuit 26 which includes a battery or other source of direct current 27 and a plug and socket device 28 which forms part of a stop device 29. The circuit 26 also includes solenoids 30, 31 (FIGURE 3) which control the position (by means described below in detail), of a hardened steel wedge 32, the wedge 32 (by means described below in detail), controlling rotation of the lead screw 17.

Referring now to FIGURES 2-6, the lead screw 17 is keyed within a sleeve 34 having a flange 35. The hand wheel 18 has a boss 36 to which the flange 35 is dowelled by means of taper pins 37, the flange 35 being secured to the boss 36 by means of cap screws 40.

Between the boss 36 and the flange 35, there is disposed an adjustable graduated annular disc 41. The latter may be locked in position by means of a screw 42 which is threaded through the boss 36 and carries a knurled head 43.

The sleeve 34 is mounted within a gear wheel 44 with a small radial clearance, e.g. of 0.001 to 0.0015 inch, therebetween. The gear wheel 44 is recessed to accommodate a hardened and tempered split and corrugated spring steel friction ring 45. The use of the friction ring 45 enables the gear wheel 44 to be mounted on the sleeve 34 by means of a light press fit. At the same time, the friction ring 45, the gear wheel 44, and the sleeve 34, together form a friction drive whose parts will slip relatively to each other if the relative torque between the gear wheel 44 and the sleeve 34 exceeds 300 to 450 lbs. inches.

The gear wheel 44 is disposed between a steel adjusting washer 46 and a sintered bronze self lubricating thrust washer 47, the latter being disposed against a thrust collar 48. The thrust collar 48, which is spigotted with a push fit onto the outside of the sleeve 34, is positively driven by means of a pin 50. The latter is received within a hole in the thrust collar 48 and engages with a slot 52 in the sleeve 34.

The gear wheel 44 and the thrust collar 48 are respectively mounted in sintered bronze self lubricating plain bearings 53, 54. The bearing 54 is disposed between the thrust washer 47 and a thrust washer 55.

The gear wheel 44 meshes with a gear 56 which is formed integrally with a roller member 57. The gear 56 meshes with a gear 60 which is formed integrally with a roller member 61.

The gears 56, 60 are mounted, by means of needle roller bearings 62, 63 respectively, on pins 64, 65, respectively.

The pins 64, 65 which are pressed with an interference fit into the casing 66 of the stop device 29 have flanges 70, 71, respectively. Extending through the flanges 70, 71 are countersunk head screws 72 by means of which the pins 64, 65 are positively connected to the casing 66.

The pins 64, 65 are drilled with oil passages 73. In the outer ends of the passages 73 there are disposed devices 74 which normally maintain the said outer ends closed but which permit oiling of the passages 73 when necessary. The passages 73 contain felt plugs 75 to prevent the ingress of foreign material.

The gears 56, 60 are located axially by being disposed between hardened thrust washers 76, 77.

The wedge 32 is disposed between the roller members 57, 61, and is substantially rectangular in cross section with part-cylindrical opposite sides 80 and flat opposite sides 81. Each of the flat opposite sides 81 is provided with a shallow concave recess 82 (see FIG. 6).

The arrangement is such that when the wedge 32 is in a central position, the roller members 57, 61 extend into and are freely rotatable in the recesses 82. The wedge 32 may, however, be moved away from this central position, into one or other of two limiting positions in which rotation of the roller members 57, 61, in one angular direction or the other is prevented.

It will be appreciated that the interference fit by means of which the pins 64, 65, are fitted into the casing 66 is provided to prevent their being lifted when the wedge 32 is moved into one of the said limiting positions.

The right hand end, as seen in FIGURE 3, of the wedge 32 is provided with a guide hole 83 in which is received a spring loaded self-centering pin 84. The other end of the wedge 32 is connected by a pin 85 to a hardened steel actuating slide 86 which is slidably mounted in a horizontal rectangular groove 87 in a bronze slide block 90. The slide block 90 is secured to the casing 66 but is spaced therefrom by an adjusting plate 91 which permits centering of the wedge 32.

The actuating slide 86 is provided with cam grooves 92, 93, within which are mounted hardened steel rollers 94, 95, respectively. The rollers 94, 95, are respectively rotatably mounted on pins 96, 97, carried by hardened steel vertically extending, dovetail slides 100, 101, respectively. The slides 100, 101 are respectievly connected by pins 102 to armatures 103, 104 respectively of the solenoids 30, 31.

The solenoids 30, 31 are adjustably mounted in a bracket 105 (see FIG. 2) which is secured to the slide block 90. A stop block 106 is provided to prevent movement of the solenoids 30, 31 after they have been finally positioned.

Return springs 107 are connected to the slides 100, 101 to urge the latter in the opposite direction to which they are pulled by the solenoids 30, 31.

The solenoids 30, 31, are respectively connected to terminals 110, 111 (FIG. 7) of a micro-switch 112 (FIGS. 3 and 7). The latter has an arm 113 which may be brought into contact with one or other of the terminals 110, 111. The arrangement is such that when the control device 25 receives an appropriate signal from the position detector device 23, and the arm 113 is in contact with one or other of the terminals 110, 111, one or other of the solenoids 30, 31, will be energised while the other solenoid will be on open circuit.

Indicator lamps 114, 115, which may be respectively labelled "Caution" and "Size" and which may be respectively coloured green and red, are also connected across the battery 27, the arrangement being such that the lamp 114 is lit when the cutting tool 20 is a predetermined short distance from its final cutting position and the indicator lamp 115 is lit when the final cutting position is reached.

The arm 113 of the micro-switch 112 is operated by a push rod 116 which engages a spring striker 117.

The spring striker 177 is secured to a bronze friction ring 120 which is mounted about a flange 118 of the gear wheel 44, there being a small radial clearance (e.g. 0.003 to 0.004 inch) between the friction ring 120 and the flange 118. The friction ring 120 is provided internally with two angularly spaced apart recesses 121 in each of which is mounted a shoe 122 which is urged by springs 123 towards contact with the gear wheel 44.

The friction ring 120 is provided externally with a recess 124. A pin 125, which is mounted in the casing 66, extends into the recess 124 so as to restrict rotation of the friction ring 120.

It will be appreciated that on rotation of the gear wheel 44, the friction ring 120 will tend to rotate in the same angular sense as the gear wheel 44 until such rotation is stopped by the stop pin 125. In one limiting position of the friction ring 120, the arm 113 of the micro-switch 112 will contact the terminal 110, while in the other limiting position of the friction ring 120, the arm 113 will contact the terminal 111. Thus the friction ring 120 senses the direction of rotation of the gear wheel 44, and hence of the lead screw 17, so as to ensure that, when an appropriate signal is received from the control device 25 (said signal occurring upon the cutting tool 20 reaching its final position), one or other of the solenoids 30, 31 will be energised.

When both the solenoids 30, 31 are de-energised, the rollers 94, 95 are locked in curved portions 126, 127 of the cam grooves 92, 93, so that there can be no movement of the actuating slide 86 (and hence of the wedge 32) in either direction.

When however the solenoid 30 is energised and the solenoid 31 is de-energised, the roller 94 is raised so as to act on the upper portion of the cam groove 92 whereby to force the actuating slide 86 (and hence the wedge 32) towards the right, as seen in FIG. 3. Similarly, when the solenoid 31 is energised and the solenoid 30 is de-energised, the roller 95 is raised so as to act on the upper part of the cam groove 93 whereby to force the actuating slide 86 (and hence the wedge 32) towards the left as seen in FIG. 3.

When the wedge 32 is moved towards the right, the arrangement may be such that the rotation of the lead screw 17 in a direction (e.g. an anti-clockwise direction) to move the cutting tool 20 towards the workpiece 21 is stopped but that movement of the lead screw in the opposite (i.e. clockwise) direction is possible. Similarly when the wedge 32 is moved towards the left, the arrangement may be that clockwise rotation of the lead screw 17 in a direction to withdraw the cutting tool 20 from the workpiece 21 is stopped, although anti-clockwise rotation of the lead screw 17 is possible.

The arrangement may be such that the friction ring 120 will be moved so as to effect movement of the arm 113 within an angular range of 7°. This however is equivalent to a movement of the cross slide 15 of 0.010 inch, assuming no backlash in the lead screw 17.

In existing machines in which wear has taken place the lead screw, however, has at least 0.010 inch backlash, and the direction of movement will therefore be sensed by the friction ring 120 before the cross slide 15 actually moves.

In operation, when the hand wheel 18 is turned anti-clockwise and the cutting tool 20 approaches the finishing position, the position detector device 23 sends a signal to the control device 25 such that the green lamp 114 marked "Caution" becomes lit, and this indicates to the operator that the final cut is imminent.

When the finished size is reached, the red lamp 115 marked "Size" lights up and the solenoid 30 (say), becomes energised. The slide 100 and roller 96 are therefore lifted, whereby the actuating slide 86 and wedge 32 move towards the right. The wedge 32 is therefore moved into a position in which it engages the roller members 57, 61, so as to prevent further anti-clockwise rotation of the lead screw 17 and thus prevent a deeper cut being taken. If undue force is now used on the hand wheel 18, the ring 45 will slip. The hand wheel 18 may, however, be rotated clockwise so as to remove the cutting tool 20 from the workpiece 21. This clockwise rotation of the lead screw 17 will cause corresponding movement of the friction ring 120 whereby the solenoid 30 will become de-energised, and the roller 94 will therefore be forced back by the springs 107 into the curved portion 126 of the cam groove 92. This will effect locking of the actuating slide 86 and wedge 32 in their central positions.

If on the other hand, the operator were to rotate the hand wheel 18 in the clockwise direction, so as to remove the cutting tool 20, before the final size was reached, the friction ring 120 would move to a position in which the arm 113 of the micro-switch 112 would contact the terminal 111. An appropriate signal would be generated by the control device 25 to operate a memory circuit therein which prevents the operator moving on to the succeeding cutting operation.

The stop device allows the tool to be moved away from the workpiece, which is necessary if the tool breaks, but prevents the tool being moved towards the workpiece when the workpiece has reached correct size.

Thus the stop device 29 prevents an undersize cut being taken and the memory circuit prevents an oversize part being made and therefore substantially reduces the formation of scrap.

In certain machining operations, such as boring, the stop device can be operated to preevnt the winding out of the tool 20. This is done by causing the solenoid 31 to be energised which actuates the slide 86 and causes the wedge 32 to be moved to the left.

Thus it will be appreciated that the stop device is reversable in operation.

I claim:

1. Apparatus for controlling a machine tool comprising a holder for holding a workpiece, a holder for holding a cutting tool, a drive transmission to the last-mentioned holder, a roller member forming part of said drive transmission, a wedge member having a concave recess into which the roller member extends, position detector means for detecting the position of the cutting tool with respect to the workpiece, an electronic information store, two solenoids which are respectively arranged to effect movement of the wedge member in opposite directions into two limiting positions, energisation of the solenoids being controlled by the position detector means and by the information store, the wedge member when in a central position permitting free rotation of the roller member in said recess, and the wedge member when in its two limiting positions respectively permitting rotation of the roller member in opposite angular senses only, a friction member which frictionally engages a part of the said drive transmission and which is moved thereby into a selected one of two limiting positions according to the sense in which the said part is moved, and a switch which is moved by the friction member between two positions in which a selected one of the solenoids is respectively put on open circuit.

2. Apparatus for controlling a machine tool having a workpiece holder, a workpiece mounted in said workpiece holder, a cutting tool holder, a cutting tool held by said cutting tool holder, said apparatus comprising a manually powered drive transmission for effecting relative movement of the cutting tool and the workpiece toward and away from each other, position sensing means for detecting the position of the cutting tool with respect to the workpiece, an information storage unit, mechanical stop means, and means controlled by the position sensing means and by the information storage unit for selectively moving the mechanical stop means into three different positions in the drive transmission, the first being the neutral position in which the stop means is out of engagement with the drive transmission, the second position being that wherein the stop means engages at least one part of the drive transmission so as to prevent movement thereof in one sense only and the third position being that wherein the stop means engages at least one part of the drive transmission so as to prevent movement thereof in the opposite sense only.

3. Apparatus for controlling a machine tool having a workpiece holder, a workpiece mounted in said workpiece holder, a cutting tool holder, a cutting tool held by said cutting tool holder, said apparatus comprising a manually powered drive transmission for effecting relative movement of the cutting tool and the workpiece toward and away from each other, position detector means for detecting the position of the cutting tool with respect to the workpiece, an information storage unit, mechanical stop means, sensor means for sensing whether the cutting tool and workpiece are being relatively moved toward or away from each other, and means controlled by the position detector means, the information storage unit, and the sensor means for selectively moving the stop means into tthree different positions in the drive transmission, the first being the neutral position in which the stop means is out of engagement with the drive transmission, the second position being that wherein the stop means engages at least one part of the drive transmission so as to prevent movement thereof in one sense only and the third position being that wherein the stop means engages at least one part of the drive transmission so as to prevent movement thereof in the opposite sense only.

4. Apparatus for controlling a machine tool having a workpiece holder, a workpiece mounted in said workpiece holder, a cutting tool holder, a cutting tool held by said cutting tool holder, said apparatus comprising a manually powered drive transmission for effecting relative movement of the cutting tool and the workpiece toward and away from each other, position detector means for detecting the position of the cutting tool witht respect to the workpiece, an information storage unit, mechanical stop means, electrically operated means controlled by the position detector means and by the information storage unit for moving said stop means into and out of engagement with the drive transmission, the stop means being selectively movable by said electrically operated means into three different positions in the drive transmission, the first being the neutral position in which the stop means is out of engagement with the drive transmission, the second position being that wherein the stop means engages at least one part of the drive transmission so as to prevent movement therof in one sense only and the third position being that wherein the stop means engages at least one part of the drive transmission so as to prevent movement thereof in the opposite sense only, a friction member frictionally engaging a part of the drive transmission and movable thereby into a selected one of two limiting positions according to the sense in which the said transmission part moves, and a switch actuated by the friction member, said switch forming part of the electrically operated means.

5. Apparatus for controlling a machine tool having a workpiece holder, a workpiece mounted in said workpiece holder, a cutting tool holder, a cutting tool held by said cutting tool holder, said apparatus comprising a manually powered drive transmission for effecting relative movement of the cutting tool and the workpiece toward and away from each other, position detector means for detecting the position of the cutting tool with respect to the workpiece, an information storage unit, mechanical stop means, two solenoids arranged to effect movement of the stop means in opposite directions in response to the position detector means and the information storage unit, said stop means being selectively movable by said solenoids into three different positions in the drive transmission, the first being the neutral position in which the stop means is out of engagement with the drive transmission, the second position being that wherein the stop means engages at least one part of the drive transmission so as to prevent movement thereof in one sense only and the third position being that wherein the stop means engages at least one part of the drive transmission so as to prevent movement thereof in the opposite sense only, a friction member frictionally engaging a part of the drive transmission and movable thereby into a selected one of two limiting positions according to the sense in which the said transmission part moves, and a switch actuated by the friction member between two positions to selectively control the two solenoids.

6. Apparatus as claimed in claim 5 in which there is an armature for each solenoid, a roller carried by each said armature, and a slide member secured to the stop means, the slide member having cam grooves in which the rollers are disposed so that, when both solenoids are deenergised, the rollers are locked in their cam grooves and prevent movement of the slide member in either direction, energisation of a selected one of the solenoids causing the respective roller to engage a part of its cam groove such as to effect movement of the slide member in a selected direction, such movement being permitted by the other roller.

7. Apparatus as claimed in claim 6 in which the stop means comprises at least one wedge member.

8. Apparatus for controlling a machine tool comprising a holder for holding a workpiece, a holder for holding a cutting tool, a drive transmission connected to the last-mentioned holder, a roller member forming part of and rotating with said drive transmissoion, a wedge member having a concave recess into which the roller member extends, a means for effecting movement in opposite directions of the wedge member into two limiting positions, the wedge member when in a central position permitting free rotation of the roller member in said recess, and the wedge member when in its two limiting positions respectively permitting rotation of the roller member in opposite rotational senses only.

9. Apparatus as claimed in claim 8 in which the drive transmission comprises two meshing gears which are respectively provided with spaced apart roller members, the wedge member being disposed between said roller members and being provided with diametrically oppositely disposed recesses into each of which one of the said roller members extends.

10. Apparatus for controlling a machine tool comprising a holder for holding a workpiece, a holder for holding a cutting tool, a drive transmission connected to the last-mentioned holder, a roller member forming part of and rotating with said drive transmission, a wedge member having a concave recess into which the roller member extends, and means for effecting movement in opposite directions of the wedge member into two limiting positions, the wedge member when in a central position permitting free rotation of the roller member in said recess, and the wedge member when in its two limiting positions respectively permitting rotation of the roller member in opposite rotational senses only, said drive transmission including a friction drive whose parts will slip relatively to each other if they are subjected to torque in a direction in which their movement is resisted by the wedge member.

11. A machine tool and control therefor comprising in combination; a holder for holding a workpiece, a holder for mounting a cutting tool, a manually powered drive mechanism connected to the tool holder for effecting relative movement of the two holders toward and away from each other, a roller member forming part of and rotating with said drive mechanism, position detecting means for detecting the position of the workpiece holder with respect to the cutting tool holder, an information storage unit, a wedge member having a concave recess into which the roller member extends, two solenoids arranged to effect movement of the wedge member in opposite directions in response to the position detecting means and the information storage unit, said wedge member being normally in a central position permitting free rotation of the roller member in said wedge recess, the wedge member when in its two limiting positions respectively permitting rotation of the roller member in opposite rotational senses only, a friction member frictionally engaging a part of the drive mechanism and movable thereby into a selected one of two limiting positions according to the sense in which the drive mechanism moves, and a switch actuated by the friction member between two positions to selectively control the two solenoids.

References Cited in the file of this patent

UNITED STATES PATENTS

| | | |
|---|---|---|
| 2,139,666 | Bogart | Dec. 13, 1938 |
| 2,384,196 | Rosen | Sept. 4, 1945 |

FOREIGN PATENTS

| | | |
|---|---|---|
| 1,114,501 | France | Dec. 19, 1955 |